United States Patent [19]

Lee

[11] Patent Number: 5,456,285

[45] Date of Patent: Oct. 10, 1995

[54] GLOBE VALVE WITH A STRAINER

[76] Inventor: Jung S. Lee, 509-505 Pureun Maheul, 76 Sunae-dong, Boondang-ku, Sungnam, Rep. of Korea

[21] Appl. No.: 331,725

[22] Filed: Oct. 31, 1994

[30] Foreign Application Priority Data

Mar. 4, 1994 [KR] Rep. of Korea .......................... 94-4121
Jul. 22, 1994 [KR] Rep. of Korea ........................ 94-18167

[51] Int. Cl.⁶ .................................................. F16K 37/00
[52] U.S. Cl. ...................... 137/556.3; 137/549; 251/225; 251/264; 251/333
[58] Field of Search ................. 137/556, 556.3, 137/549; 251/324, 333, 264, 225

[56] References Cited

U.S. PATENT DOCUMENTS

| | | | |
|---|---|---|---|
| 1,616,672 | 2/1927 | Wilson | 251/333 |
| 1,919,233 | 7/1933 | Lee | 137/556.3 |
| 2,694,547 | 11/1954 | MacGregor | 251/264 |
| 3,748,837 | 7/1973 | Billeter | 137/549 |
| 4,736,766 | 4/1988 | Bathrick | 137/315 |

FOREIGN PATENT DOCUMENTS 1804340  7/1970  Germany ............................. 137/549

Primary Examiner—A. Michael Chambers
Attorney, Agent, or Firm—Darby & Darby

[57] ABSTRACT

A globe valve with a strainer.

The globe valve with a strainer comprising a valve body having a valve box, a strainer body, the valve box and the strainer body extending upwardly and downwardly respectively at an angle of about 45° to the axis of the valve body, a valve seat hole positioned at the intersection of the axes of the valve body and the valve box, the surface of the vavle seat hole formed at an angle of about 90° with the axis of the valve box, a hole positioned at the intersection of the axes of the valve body and the strainer body, the surface of the hole formed at an angle of about 90° with the axis of the strainer body.

3 Claims, 1 Drawing Sheet

GLOBE VALVE WITH A STRAINER

BACKGROUND OF THE INVENTION

1. Field of the invention

The present invention relates to a globe valve, and more particularly to a globe valve wherein a strainer is mounted in the same body and a valve stem is inclined with reference to the axis of the valve body.

2. Description of the prior art

Usually, when using a strainer for the purpose of protecting an apparatus like a safety valve or a calorimeter, a valve must be mounted on an inlet which is at the left side of the strainer, as a locking device for cleaning or replacing the strainer.

U.S. Pat. No. 4,736,766 has disclosed a flow shut-off valve. In this invention, when fluid initially passes inlet section 40, some part of the fluid is dashed against vertical portions 35 and 36 of the partition wall 34, creating a vortex flow and a back pressure space, thus the flow stream cannot become linear and smooth. And, when the circular opening 44 is opened, an air hammer phenomenon beating the inner surface of the valve body occurs due to the difference of the fluid pressure between the inlet section 40 and the outlet section 41. And, since the valve member assembly 54 is positioned at the inlet section 40, it is difficult to operate the hand wheel 56. Moreover, since the passage is very narrow compared with the inlet 41, fluid meet with strong resistance when passing the partition wall 34 and cannot flow in a pipe of a large diameter.

SUMMARY OF THE INVENTION

Therefore, an object of the present invention is to provide a globe valve with a strainer wherein a valve stem is inclined to the axis of the valve body and a valve member has a guide portion, so that a fluid guide hole can be closed and opened completely by a smooth operation of a hand wheel and an air hammer phenomenon can be avoided.

Another object of the present invention is to provide a globe valve with a strainer wherein a partition wall has been eliminated to enable linear flow stream and easy manufacture of a valve body.

In accordance with the present invention, the above objects can be accomplished by providing a globe valve with a strainer comprising a valve body having a valve box, a strainer body, the valve box and the strainer body extending upwardly and downwardly respectively at an angle of about 45° to the axis of the valve body, a valve seat hole positioned at the intersection of the axes of the valve body and the valve box, the surface of the vavle seat hole formed at an angle of about 90° with the axis of the valve box, a hole positioned at the intersection of the axes of the valve body and the strainer body, the surface of the hole formed at an angle of about 90° with the axis of the strainer body.

BRIEF DESCRIPTION OF THE DRAWINGS

Other objects and advantages of the present invention will become apparent from the following description of embodiment with reference to the accompanying drawings in which.

DETAILED DESCRIPTION OF THE PREFERRED EMBODIMENT

Figure 1:
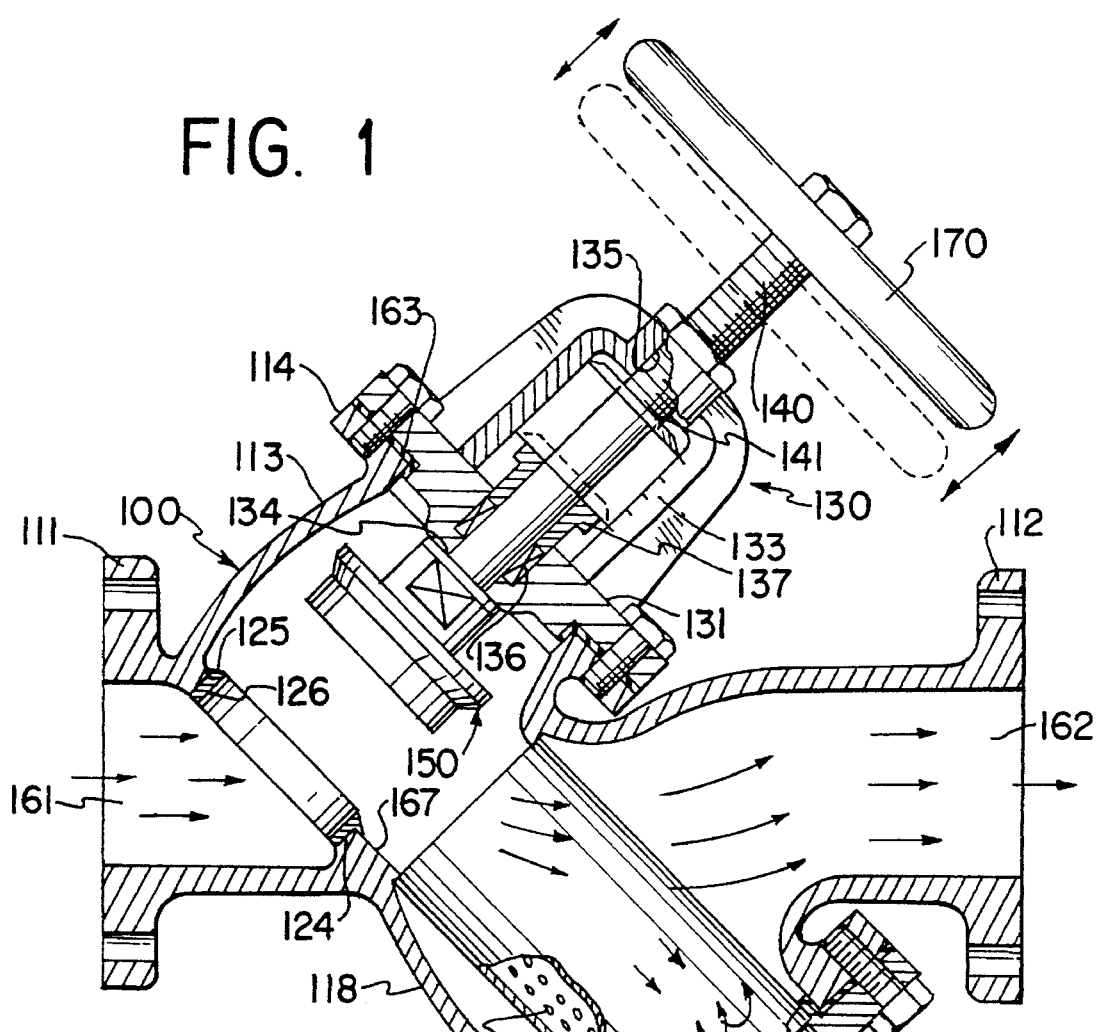
FIG. 1 is a sectional view of a globe valve with a strainer according to the present invention.

Referring to FIG. 1, the present invention includes a valve body 100 that has an inlet 161, an outlet 162, a valve box 113 having an upper flange 114 and extended upwardly at an angle of about 45° to the axis of the valve body 100, a valve seat hole 124, a hole 167, and a strainer body 118 extended downwardly at an angle of about 45° to the axis of the valve body 100, the valve box 113 and the strainer body 118 having openings 163 and 166, respectively.

The valve seat hole 124 is positioned at the intersection of the axes of the valve body 100 and the valve box 113 and its surface is formed at an angle of about 90° with reference to the axis of the valve box 113, separating the interior of the valve body 100 into an inlet section and an outlet section.

The hole 167 positioned at the intersection of the axes of the valve body 100 and the strainer body 118 communicates with the outlet 162 and its surface is formed at an angle of about 90° with reference to the strainer body 118.

The center of the valve seat hole 124 has a predetermined distance from the center of the hole 167.

An annular seat 125 having a fluid guide hole 126 fits into the valve seat hole 124.

The opening 163 of the valve box 113 is closed by a cover 130 that has a flange 131 removably attached to the upper flange 114 and a guide bracket 133 formed upwardly from the flange 131 at a predetermined height. The flange 131 and the guide bracket 133 have holes 134 and 135 formed coaxially in order to receive a valve stem 140 carrying a valve member 150 on its lower end.

The valve stem 140 is externally rotated by a hand wheel 170 rotatably fixed to its upper end.

The opening 166 of the strainer body 118 is closed by a strainer cover 180 which has a cylindrical portion 183 being inserted into the opening 166, a stepped circular groove 182 for mounting a cylindrical strainer 190 and a hole 181 penetrated from its bottom surface to the groove 182 for mounting a plug 184. The cylindrical strainer 190 having a plurality of holes 191 is inserted into the strainer body 118, covering the hole 167 in order to strain fluid. The strainer 190 can be easily taken out for cleaning and replacement by simply removing the cover 180. A plug 184 threaded in the hole 181 provides access to the interior of the strainer 190 if desired and can be used as a drain plug.

The valve stem 140 has an indicating plate 141 and the guide bracket 133 is provided with a scale.

Reference numbers 136 and 137 denote a packing and a packing gland.

Figure 2:
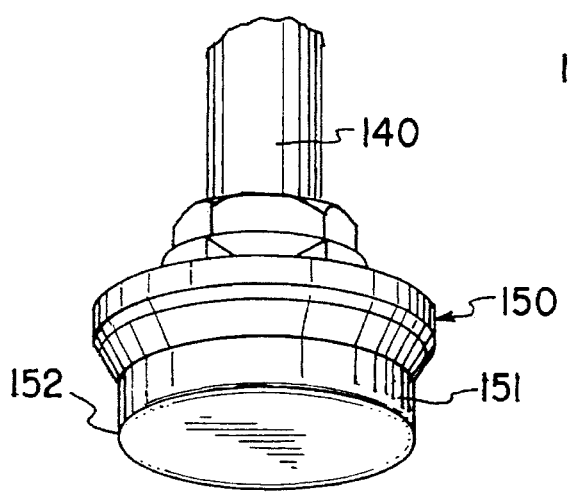
FIG. 2 is a perspective view of a valve member according to the present invention.

FIG. 2 is a perspective view of a valve member according to the present invention. As shown in FIG. 2, the valve member 150 has a taper portion 152 and a guide portion 151 in which the outside diameter and thickness are the same as the inside diameter and the depth of the fluid guide hole 126. The valve member 150 is exactly guided into the fluid guide hole 126 by the guide portion 151 and stopped by the taper portion 152, thereby completely closing the flow stream.

In operation of the globe valve with a strainer according to the present invention, when the valve stem 140 is moved upwardly by the rotating force of the hand wheel 170, the fluid guide hole 126 of the annular seat 125 is opened, connecting the inlet 161 and the outlet 162 with each other.

In this state, fluid passes linearly through the fluid guide hole 126 and the strainer 190 having a plurality of holes 191, thus straining the fluid.

On the contrary, when the valve stem 140 is moved downwardly by the rotating force of the hand wheel 170, the fluid guide hole 126 of the annular seat 125 is closed. In this state, the strainer 190 can be easily taken out for cleaning and replacement by simply removing the strainer cover 180.

As apparent from the above description, the present invention has the following effects:

Firstly, since the valve stem 140 is inclined to the axis of the valve body 100, the valve member 150 moves along with the flow stream when the fluid guide hole 126 is opened and the pressure of fluid is exerted obliquely against the bottom surface of the valve member 150, thereby the fluid guide hole 126 can be closed or opened completely without difficulty in operating the hand wheel 170, and since the guide portion 151 of the valve member 150 exactly fits to the fluid guide hole 126 of the annular seat 125, the flow stream can be closed completely.

Secondly, time to completely separate the valve member 150 from the fluid guide hole 126 is delayed as much as the thickness of the guide portion 151 of the valve member 150 and therefore the pressure difference between the inlet section and the outlet section of the valve body 100 decreases slowly, thus without causing the air hammer phenomenon.

Thirdly, since the partition wall has been eliminated, not only the flow stream becomes linear, but also the manufacture of a valve body 100 becomes easy and therefore manufacturing cost can be lowered.

Lastly, when the valve stem 140 moves upwardly and downwardly, the indicating plate 141 indicates a scale of the guide bracket 133, so that the amount of fluid can be controlled.

Although the preferred embodiments of the invention have been disclosed for an illustrative purpose, those skilled in the art will appreciate that various modifications, additions and substitutions are possible, without departing from the scope and spirit of the invention as described in the accompanying claims.

What is claimed is:

1. A globe valve with a strainer comprising:

a valve body having an inlet, an outlet, the inlet coaxially connected with the outlet, a valve box, a strainer body, the valve box and the strainer body extending upwardly and downwardly respectively at an angle of about 45° to the axis of the valve body, a valve seat hole positioned at the intersection of the axes of the valve body and the valve box, the surface of the valve seat hole formed at an angle of about 90° with the axis of the valve box, a hole positioned at the intersection of the axes of the valve body, the surface of the hole formed at an angle of about 90° with the axis of the strainer body, the valve box and the strainer body having an opening respectively;

an annular seat having a fluid guide hole and fitted into said valve seat hole;

a cover for covering said valve box, the cover having a guide bracket formed upwardly from its flange at a predetermined height, holes coaxially formed at the flange and the guide bracket;

a valve stem reciprocating in the holes of said cover;

an externally operable valve member for closing said fluid guide hole and fixed to the lower end of said valve stem, whereby the interior of the valve body is separated into an inlet section and an outlet section;

a removable strainer cover attached to said strainer body;

a strainer having a plurality of holes for straining fluid and inserted into said strainer body and mounted on said hole of the valve body;

whereby the fluid passes linearly from the inlet to the outlet when the fluid guide hole is opened.

2. A globe valve with a strainer, as claimed in claim 1, wherein the valve member has a guide portion of which outside diameter and thickness are the same as the inside diameter and the depth of the fluid guide hole, and a taper portion, whereby completely closing the fluid guide hole.

3. A globe valve with a strainer, as claimed in claim 1, wherein said valve stem has an indicating plate and the guide bracket is provided with a scale.

* * * * *